(12) United States Patent
Byeon et al.

(10) Patent No.: US 11,466,630 B2
(45) Date of Patent: Oct. 11, 2022

(54) DEVICE AND METHOD FOR CONTROLLING PURGE OF VEHICLE

(71) Applicants: HYUNDAI MOTOR COMPANY, Seoul (KR); KIA MOTORS CORPORATION, Seoul (KR)

(72) Inventors: Min Byeon, Yongin-si (KR); Howoong Bae, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/692,495

(22) Filed: Nov. 22, 2019

(65) Prior Publication Data

US 2021/0017920 A1    Jan. 21, 2021

(30) Foreign Application Priority Data

Jul. 17, 2019    (KR) .................. 10-2019-0086381

(51) Int. Cl.
*F02D 41/00*    (2006.01)
*F02D 41/22*    (2006.01)
*F02M 25/08*    (2006.01)

(52) U.S. Cl.
CPC .......... *F02D 41/004* (2013.01); *F02D 41/22* (2013.01); *F02M 25/0836* (2013.01)

(58) Field of Classification Search
CPC .... F02D 41/004; F02D 41/22; F02M 25/0836

(Continued)

(56) References Cited

U.S. PATENT DOCUMENTS 5,596,972 A * 1/1997 Sultan ................ F02D 41/1401
                                                  123/520
5,676,118 A * 10/1997 Saito .................... F02D 41/0045
                                                  123/520

(Continued)

FOREIGN PATENT DOCUMENTS

DE   10 2016 221 868 A1   5/2018
JP       2012-255398 A    12/2012

OTHER PUBLICATIONS

Extended European Search Report issued in corresponding European Patent Application No. 19211382.7 dated May 27, 2020.

*Primary Examiner* — Logan M Kraft
*Assistant Examiner* — John D Bailey
(74) *Attorney, Agent, or Firm* — Morgan, Lewis & Bockius LLP

(57) ABSTRACT

A device for controlling purge of a vehicle includes: a state detector detecting state information to control purge of an engine; a controller generating an amount of fuel of each of cylinders of the engine using an amount of air of each cylinder, compensation information, a lambda control value, and an amount of a purge gas of the engine, checking a purge distribution coefficient according to an amount of an intake air for each cylinder when the state information satisfies a control entry condition, generating an amount of redistribution of the purge gas using the amount of the purge gas and the purge distribution coefficient, and generating an injection time for each cylinder using the amount of fuel, a conversion coefficient, and the amount of redistribution of the purge gas; and an injector injecting fuel in each cylinder during the injection time based on control of the controller.

11 Claims, 9 Drawing Sheets

(58) Field of Classification Search
USPC ........................................................ 123/520
See application file for complete search history.

(56) References Cited

U.S. PATENT DOCUMENTS

| | | | | |
|---|---|---|---|---|
| 5,813,389 A * | 9/1998 | Kitamura | ............. | F02D 41/008 |
| | | | | 123/687 |
| 2001/0052339 A1 * | 12/2001 | Halleron | ................ | F02M 26/01 |
| | | | | 123/519 |
| 2002/0129797 A1 * | 9/2002 | Hayashi | ............. | F02D 41/0042 |
| | | | | 123/698 |
| 2002/0129802 A1 * | 9/2002 | Hayashi | ............. | F02D 41/0032 |
| | | | | 123/698 |
| 2003/0047161 A1 * | 3/2003 | Bagnasco | ........... | F02D 41/0042 |
| | | | | 123/295 |
| 2003/0221655 A1 * | 12/2003 | Surnilla | ................ | F01N 13/011 |
| | | | | 123/198 F |
| 2003/0221659 A1 * | 12/2003 | Surnilla | ............. | F02D 41/1453 |
| | | | | 123/305 |
| 2003/0221681 A1 * | 12/2003 | Bidner | ................ | F02D 41/2448 |
| | | | | 123/520 |
| 2003/0221682 A1 * | 12/2003 | Surnilla | .................. | F02D 37/02 |
| | | | | 123/688 |
| 2003/0224907 A1 * | 12/2003 | Surnilla | ............. | F02D 41/0087 |
| | | | | 477/182 |
| 2004/0045538 A1 * | 3/2004 | Tagami | ............... | F02D 41/0032 |
| | | | | 123/520 |
| 2005/0274353 A1 * | 12/2005 | Okubo | ................. | F02M 63/029 |
| | | | | 123/299 |
| 2010/0263635 A1 * | 10/2010 | Hori | ...................... | F02D 19/061 |
| | | | | 123/520 |
| 2012/0022772 A1 * | 1/2012 | Miyamoto | .......... | F02D 41/1495 |
| | | | | 701/104 |
| 2012/0185156 A1 * | 7/2012 | Iwazaki | ............. | F02D 41/0085 |
| | | | | 701/104 |
| 2016/0201613 A1 * | 7/2016 | Ulrey | .................. | F02M 25/089 |
| | | | | 123/520 |
| 2016/0201615 A1 * | 7/2016 | Pursifull | ................. | F02D 41/26 |
| | | | | 123/520 |
| 2016/0305361 A1 * | 10/2016 | Akita | .................. | F02D 41/2438 |
| 2016/0369713 A1 * | 12/2016 | Pursifull | ............. | F02M 35/104 |
| 2016/0369721 A1 * | 12/2016 | Pursifull | ............... | F02D 41/004 |
| 2017/0314512 A1 * | 11/2017 | Dudar | ............... | F02M 25/0836 |
| 2019/0271278 A1 * | 9/2019 | Surnilla | ............. | F02D 41/3076 |
| 2020/0271069 A1 * | 8/2020 | Muto | ............... | F02D 41/2438 |

* cited by examiner

| Flow amount of intake air \ Cylinder information | Cyl #1 | Cyl #2 | Cyl #3 | Cyl #4 | Total |
|---|---|---|---|---|---|
| 5 | 1.1 | 1.1 | 1.1 | 0.7 | 4 |
| 10 | 1.05 | 1.05 | 1.05 | 0.85 | 4 |
| 15 | 1 | 1 | 1 | 1 | 4 |
| 30 | 1 | 1 | 1 | 1 | 4 |

DEVICE AND METHOD FOR CONTROLLING PURGE OF VEHICLE

CROSS-REFERENCE TO RELATED APPLICATION

This application claims priority to and the benefit of Korean Patent Application No. 10-2019-0086381 filed in the Korean Intellectual Property Office on Jul. 17, 2019, the entire contents of which are incorporated herein by reference.

BACKGROUND

(a) Field

The present disclosure relates to an apparatus for controlling purge of a vehicle.

(b) Description of the Related Art

Regulations on global warming are expected to be tightened in the future, and strong regulations will be applied to an exhaust gas of a vehicle, which is considered to be a major cause of carbon dioxide emissions. To cope with this, the vehicle industry is responding to the global warming regulations by optimizing engine performance to improve fuel efficiency and by optimizing an exhaust gas purification system to minimize air pollution.

Therefore, a multi-cylinder engine for the vehicle has been developed to provide higher output and fuel efficiency.

The multi-cylinder engine is an engine with a plurality of cylinders and increases output and displacement. The multi-cylinder engine includes a gasoline direct injection (GDI) engine, a multi-point injection (MPI) engine, a dual port injection (DPI) engine, and the like.

The GDI engine does not inject fuel into an intake pipe or an intake manifold, but direct injects the fuel into a combustion chamber. The MPI engine has a fuel injection valve installed for each cylinder of the engine and injects fuel into an intake manifold in advance with an injector of each cylinder. The DPI engine has a fuel injection valve installed for each cylinder of the engine and injects fuel into an intake manifold in advance. Each cylinder has two intake valves and two exhaust valves and an injector is formed in each of the two intake valves.

The disclosure of this section is to provide background information relating to the invention. Applicant does not admit that any information contained in this section constitutes prior art.

SUMMARY

Aspects of the present invention provide a device and a method for controlling purge of a vehicle capable of redistributing an amount of a purge gas to each cylinder of an engine of the vehicle when imbalance of the purge gas in each cylinder occurs due to poor shape of an intake manifold of the engine. Aspects of the invention also provide a device and a method for controlling purge of a vehicle capable of improving engine roughness by redistributing an amount of purge gas to each cylinder of an engine when imbalance of the purge gas in each cylinder occurs due to poor shape of an intake manifold.

Further, aspects of the invention further provide the device and the method for controlling purge of the vehicle capable of learning purge concentration or a concentration of the purge gas and redistributing a lambda control value.

An embodiment of the present invention may provide the device for controlling purge of the vehicle, including: a state detector configured to detect state information to control purge of an engine of the vehicle; a controller configured to generate an amount of fuel supplied to each of cylinders of the engine using an amount of air of each cylinder, compensation information, a lambda control value, and an amount of a purge gas of the engine, check a purge distribution coefficient based on an amount of an intake air for each cylinder when the state information satisfies a control entry condition, generate an amount of redistribution of the purge gas using the amount of the purge gas and the purge distribution coefficient, and generate an injection time for each cylinder using the amount of fuel, a conversion coefficient, and the amount of redistribution of the purge gas; and an injector configured to inject fuel in each cylinder during the injection time based on control of the controller.

The controller may be configured to determine that the state information satisfies the control entry condition when a duty of a purge valve transferring the purge gas that is the state information is greater than or equal to a first reference value and the lambda control value that is the state information is less than a second reference value.

The controller may be configured to determine that the state information satisfies the control entry condition when a ratio of a flow amount of a purge valve transferring the purge gas to the amount of air that is the state information is greater than or equal to a third reference value, a number of rotation of the engine that is the state information is less than a fourth reference value, and an engine roughness difference value between the cylinders that is the state information is greater than or equal to a fifth reference value.

The engine may include a first cylinder, a second cylinder, a third cylinder, and a fourth cylinder, and the controller may generate the roughness difference value by calculating a difference value between an average value of engine roughness of the fourth cylinder and an average value of engine roughness of one of the first cylinder, the second cylinder, and the third cylinder.

The controller may be configured to check a setting map matching information of each cylinder and the amount of the intake air with the purge distribution coefficient and to extract the purge distribution coefficient matched to the cylinder information and the amount of the intake air.

The controller may be configured to generate a lambda distribution coefficient using the lambda control value and the purge distribution coefficient and to generate the injection time using the amount of fuel, the conversion coefficient, the amount of redistribution of the purge gas, and the lambda distribution coefficient.

The controller may be configured to generate the amount of the purge gas using a flow amount of a purge valve transferring the purge gas and a purge learning concentration value.

The controller may be configured to generate the purge learning concentration value by performing an integral control using a lambda detection value, a compensation coefficient based on a ratio of the flow amount of the purge valve to the amount of air, and a compensation coefficient based on an amount of fuel of the injector.

An embodiment of the present invention may provide the method for controlling purge of the vehicle, including: checking, by a controller, state information; generating, by the controller, an amount of fuel supplied to each of cylinders of the engine using an amount of air of each cylinder, compensation information, a lambda control value, and an amount of a purge gas of the engine; determining, by the controller, whether the state information satisfies a control entry condition; checking, by the controller, a purge distribution coefficient based on an amount of an intake air for each cylinder and information of each cylinder when the state information satisfies the control entry condition; generating, by the controller, an amount of redistribution of the purge gas using the amount of the purge gas and the purge distribution coefficient; and generating, by the controller, an injection time for each cylinder using the amount of fuel, a conversion coefficient, and the amount of redistribution of the purge gas.

The generating the amount of fuel may include: generating, by the controller, the amount of the purge gas using a flow amount of a purge valve transferring the purge gas and a purge learning concentration value; and generating, by the controller, the amount of fuel using the amount of air of each cylinder, a temperature compensation coefficient, an injector deviation coefficient, a lambda compensation coefficient, and a speed compensation coefficient included in the compensation information, the lambda control value, and the amount of the purge gas.

The generating the amount of the purge gas may include: generating, by the controller, the purge learning concentration value by performing an integral control using a lambda detection value, a compensation coefficient based on a ratio of the flow amount of the purge valve to the amount of air, and a compensation coefficient based on an amount of fuel of the injector; and generating, by the controller, the amount of the purge gas using the flow amount of the purge valve and the purge learning concentration value.

The determining whether the state information satisfies the control entry condition may include: determining, by the controller, that the state information satisfies the control entry condition when a duty of a purge valve transferring the purge gas that is the state information is greater than or equal to a first reference value and the lambda control value that is the state information is less than a second reference value.

The determining whether the state information satisfies the control entry condition may include: determining, by the controller, that the state information satisfies the control entry condition when a ratio of a flow amount of a purge valve transferring the purge gas to the amount of air that is the state information is greater than or equal to a third reference value, a number of rotation of the engine that is the state information is less than a fourth reference value, and an engine roughness difference value between the cylinders that is the state information is greater than or equal to a fifth reference value.

The checking the purge distribution coefficient may include: extracting, by the controller, the purge distribution coefficient matched to information of each cylinder and the amount of the intake air to check the purge distribution coefficient.

The generating the injection time may include: generating, by the controller, a lambda distribution coefficient using the lambda control value and the purge distribution coefficient; and generating, by the controller, the injection time using the amount of fuel, the conversion coefficient, the amount of redistribution of the purge gas, and the lambda distribution coefficient.

The device and the method for controlling purge of the vehicle according to the embodiment of the present invention may generate a uniform air/fuel ratio and may improve performance and fuel efficiency of the engine by redistributing an amount of the purge gas to each cylinder when imbalance of the purge gas in each cylinder occurs due to poor shape of the intake manifold.

Further, the embodiment of the present invention may improve engine roughness and prevent a misfire of the engine by learning the purge concentration and redistributing the lambda control value.

In addition to the aforementioned advantageous effect, an effect that may be obtained or anticipated by applying an embodiment of the present invention will be disclosed explicitly or implicitly in the detailed description of the embodiment of the present invention. In other words, various effects expected by applying an embodiment of the present invention will be disclosed within the detailed description to be provided later.

BRIEF DESCRIPTION OF THE DRAWINGS

FIG. 7 is an diagram showing a setting map used in the method for controlling purge of the vehicle according to an embodiment of the present invention.

DETAILED DESCRIPTION OF EMBODIMENTS

Hereinafter, an operation principle of a device and a method for controlling purge of a vehicle according to an embodiment of the present invention will be described in detail with reference to the description and the accompanying drawings. However, the drawings and the detailed description relate to one embodiment among several embodiments for effectively describing features of the present invention. Therefore, the present invention is not limited only to the drawings and description.

Further, in describing below embodiments of the present invention, the related well-known functions or constructions will not be described in detail since they may unnecessarily obscure the understanding of the present invention. Further, the following terminologies are defined in consideration of the functions in the present invention and may be construed in different ways by the intention of users and operators, practice, or the like. Therefore, the definitions thereof should be construed based on the contents throughout the specification.

Further, to effectively describe core technical features of the present invention, terms may be appropriately changed, integrated, or separated for those skilled in the art in a technical field to which the present invention belongs to explicitly understand the present invention, but the present invention is not limited thereto.

Hereinafter, one embodiment of the present invention will be described in detail with reference to the accompanying drawings.

Some multi-cylinder engines may have imbalance of purge distribution or purge gas distribution in each cylinder generated due to poor shape of the intake manifold. When the imbalance is generated, a purge gas in a specific cylinder may be lean or rich so that engine roughness deteriorates or is increased and a misfire occurs.

When a flow amount of the fuel is low, some of the purge gas may not flow into the specific cylinder due to poor shape of the intake manifold so that the purge gas in the specific cylinder is lean. Accordingly, output, performance, fuel efficiency, etc. of the engine are deteriorated.

Figure 1:
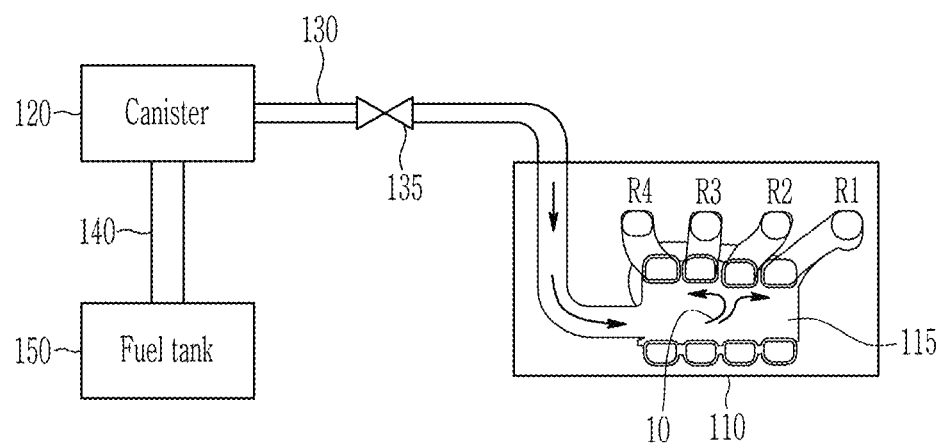
FIG. 1 is a configuration diagram showing a device for controlling purge of a vehicle according to an embodiment of the present invention.

FIG. 1 is a configuration diagram showing a device for controlling purge of a vehicle according to an embodiment of the present invention.

A vortex phenomenon 10 may occur due to poor shape of an intake manifold 115 included in the engine 110 in embodiments of the present invention shown in FIG. 1 when a fuel and a purge gas are inhaled into the intake manifold 115. Thus, some of the purge gas does not flow into a fourth cylinder of the engine so that the purge gas in the fourth cylinder is lean. Embodiments of the present invention may provide redistributing an amount of purge gas to each cylinder to provide an optimal air/fuel ratio to each cylinder.

Referring to FIG. 1, the device for controlling purge of the vehicle may the engine 110, a canister 120, a purge valve 135, and a fuel tank 150.

The engine 110 may generate power for driving the vehicle using the fuel stored in the fuel tank 150. In embodiments, the engine 110 may convert chemical energy into mechanical energy by combusting fuel and air. The engine 110 may generate combust torque by controlling ignition timing, an amount of air, an amount of fuel, and an air/fuel ratio. The engine 110 may include a plurality of cylinders that are powered by combustion of fuel.

The engine 110 may inhale air into the cylinders through the runners of the intake manifold 115 and may emit an exhaust gas generated during a combustion process out of the engine through an exhaust manifold. A first runner R1 of the intake manifold 115 may be connected to a first cylinder, a second runner R2 of the intake manifold may be connected to a second cylinder, a third runner R3 of the intake manifold may be connected to a third cylinder, and a fourth runner R4 of the intake manifold may be connected to the fourth cylinder.

The engine 110 may be connected to the canister 120 via a supply line 130. An evaporation gas or the purge gas collected in the canister 12 may flow into the engine 110 through the purge valve 135.

The evaporation gas of the fuel tank 150 may flow into the canister 120. In an implementation, the canister 120 may collect the evaporation gas exhausted from the fuel tank 150 through a collection line 140.

The canister 120 may supply the evaporation gas to each of the cylinders of the engine 110 through the supply line 130 when the engine 110 is driven. The purge valve 135 may be include in the supply line 130 and may be disposed or installed between the engine 110 and the canister 120.

The purge valve 135 may transfer or shut off the evaporation gas collected by the canister 120 to the engine 110. In one implementation, the purge valve 135 may periodically open the supply line 130 to transfer the evaporation gas and may close the supply line 130 not to transfer the evaporation gas.

The fuel tank 150 may store fuel for driving the engine 110. The fuel tank 150 may be connected to the canister 120 via the collection line 140.

Figure 2:
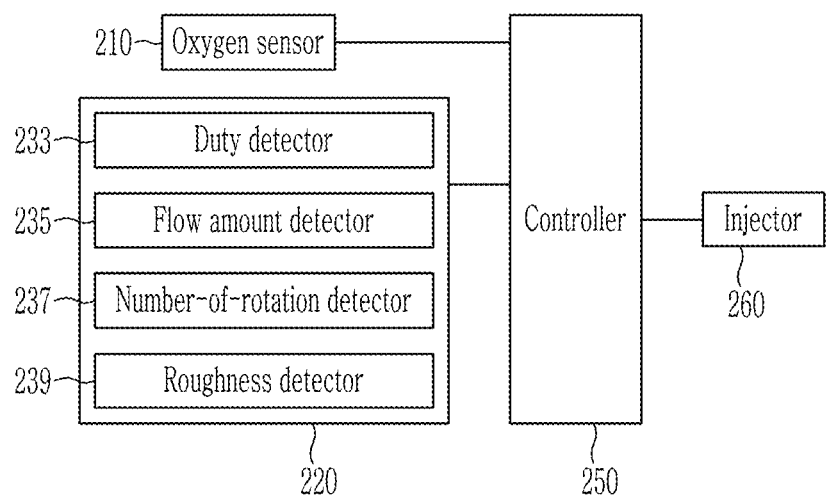
FIG. 2 is a block diagram showing the device for controlling purge of the vehicle according to an embodiment of the present invention.

FIG. 2 is a block diagram showing the device for controlling purge of the vehicle according to an embodiment of the present invention.

Referring to FIG. 2, the device for controlling purge of the vehicle may include an oxygen sensor 210, a state detector 220, one or more controllers 250, and an injector 260.

The oxygen sensor 210 may detect an amount of oxygen in the exhaust gas. The oxygen sensor 210 may provide the detection information to the controller 250. The detection information may be represented or indicated by lambda λ. The lambda may represent a ratio of an actual air amount to a theoretical air amount. When the lambda exceeds 1, air may be lean. When the lambda is below 1, air may be rich.

The state detector 220 may detect state information to control purge (e.g., a purge gas) of the vehicle or purge of the engine. The state detector 220 may include a duty detector 233, a flow amount detector 235, a number-of-rotation detector 237, and a roughness detector 239.

The duty detector 233 may detect a duty or a duty ratio of the purge valve 135 and may provide the detected duty of the purge valve to the controller 250.

The flow amount detector 235 may detect a flow amount or a flow rate flowing through the purge valve 135 and may provide the detected flow amount of the purge valve 135 to the controller 250. When the flow amount detector 235 is not included in the device for controlling purge of the vehicle, the controller 250 may check or confirm a flow amount of the purge valve 135 using a predetermined characteristic curve set based on an amount of air in the cylinder.

The number-of-rotation detector 237 may detect a number of rotation (e.g., revolutions per minute (RPM)) of the engine 110 and may provide the detected number of rotation of the engine to the controller 250.

The roughness detector 239 may detect engine roughness for each of the cylinders generated during combustion of the engine 110. The roughness detector 239 may provide the detected engine roughness for each cylinder to the controller 250.

The state detector 220 includes the duty detector 233, the flow amount detector 235, the number-of-rotation detector 237, and the roughness detector 239, but is not limited thereto. The state detector 220 may further include a coolant temperature detector, an exhaust temperature detector, a brake pedal detector, an accelerator pedal detector, etc. to control purge of the vehicle.

The controller 250 may control the oxygen sensor 210, the state detector 220, and the injector 260 which are constituent elements of the purge control device.

The controller 250 may receive detection information from the oxygen sensor 210. The controller 250 may perform lean/rich control based on the amount of oxygen in the exhaust gas detected by the oxygen sensor 210.

The controller 250 may receive state information from the state detector 220. The controller 250 may determine whether a control entry condition is satisfied based on the state information. In one implementation, the controller 250 may determine that the control entry condition is satisfied when the duty of the purge valve 135 that is the state information is greater than or equal to a first reference value and a lambda control value that is the state information is less than a second reference value.

The lambda control value may be a value generated by feedback control based on the detection information detected by the oxygen sensor 210. The first reference value and the second reference value may be set in advance as a reference value to determine whether the control entry condition is satisfied.

The controller 250 may check or confirm a purge distribution coefficient based on the cylinder information and an amount or a flow amount of an intake air in the intake manifold 115 when the control entry condition is satisfied. The cylinder information may be a number indicating an order of the cylinders. The amount of an intake air may represent an amount of air drawn into the engine 110.

The controller 250 may generate a fuel injection time for each of the cylinders using an amount of air of the cylinder, compensation information, an amount of the purge gas of the engine, and the lambda control value. In one implementation, the controller 250 may generate or calculate an amount of fuel supplied to the engine 110 using the amount of air of the cylinder, the compensation information, the amount of the purge gas, and the lambda control value. The controller 250 may generate an amount of redistribution of the purge gas using the amount of the purge gas and the purge distribution coefficient. The controller 250 may use the amount of fuel and the amount of redistribution of the purge gas to generate the injection time for each of the cylinders.

The controller 250 may control the injector 260 based on the generated injection time to supply fuel to the engine 110.

The controller 250 may be implemented as at least one microprocessor operated by a program. The program may include a series of commands for executing a method for controlling purge of the vehicle according to the embodiment of the present invention described below. The method for controlling purge of the vehicle will be described in more detail referring to FIG. 3 to FIGS. 8A and 8B.

The injector 260 may be installed corresponding to each cylinder. This injector 260 may supply fuel to a combustion chamber of engine 110 under control of the controller 250. In one implementation, the injector 260 may inject fuel into each cylinder in response to the injection time generated by the controller 250.

In the following the method for controlling purge of the vehicle will be described referring to FIG. 3 to FIGS. 8A and 8B. Hereinafter, a dual port injection (DPI) engine in which two injectors 260 are formed in one cylinder will be described as an example. However, the present invention is not limited thereto and may be a multi-cylinder engine such as a gasoline direct injection (GDI) engine and a multi-point injection (MPI) engine.

Figure 3:
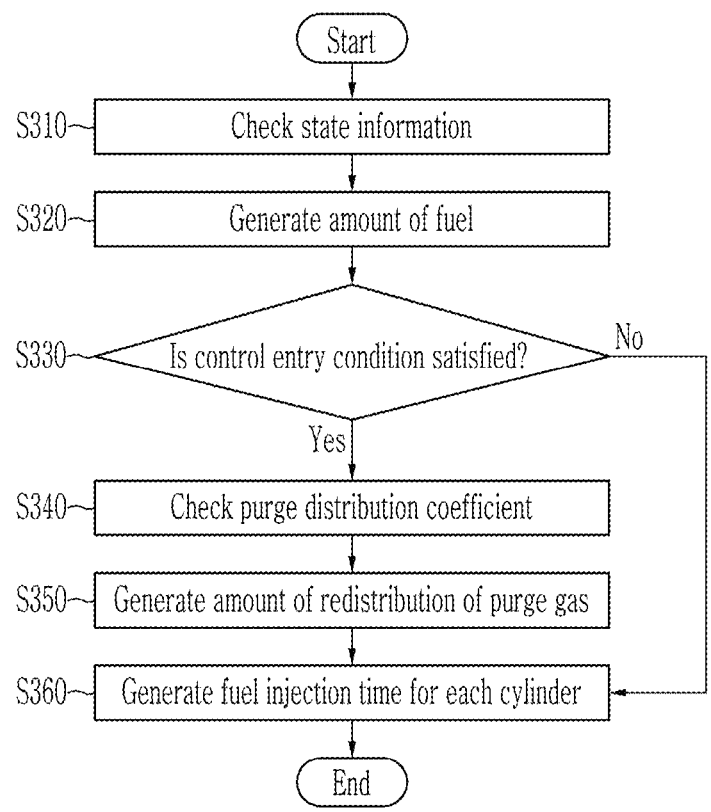
FIG. 3 is a flowchart showing a method for controlling purge of a vehicle according to an embodiment of the present invention.
Figure 4:
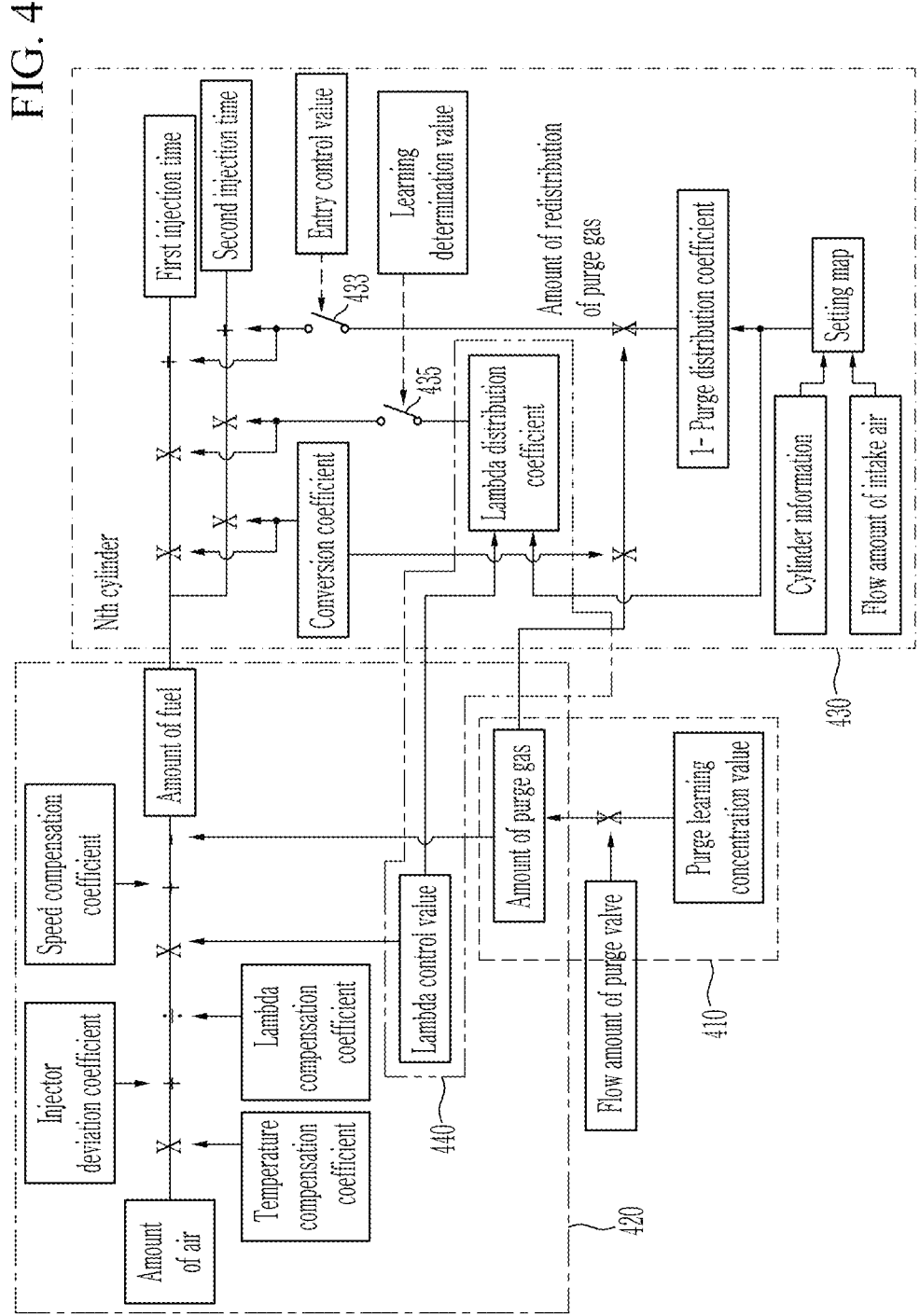
FIGS. 4 to 6 are diagrams shown to explain the method for controlling purge of the vehicle according to an embodiment of the present invention.
Figure 5:
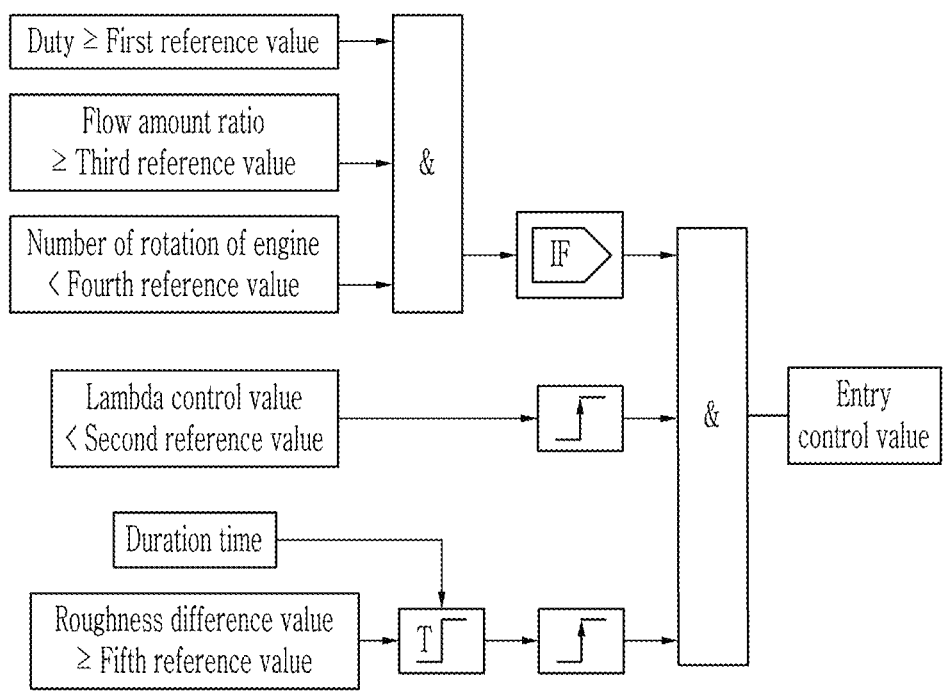
Figure 6:
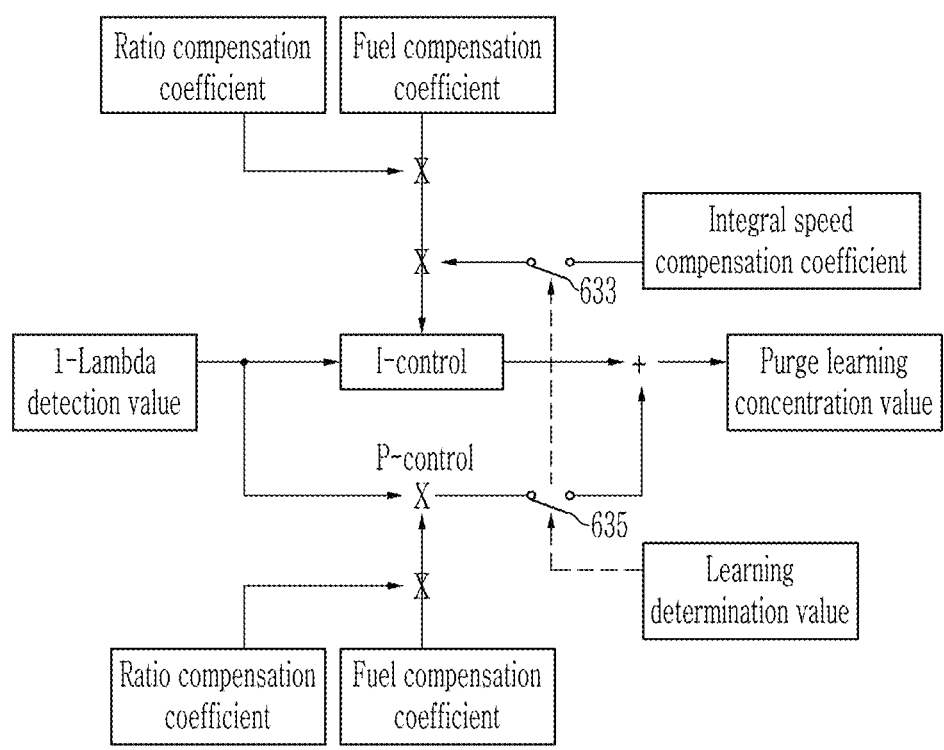

FIG. 3 is a flowchart showing the method for controlling purge of the vehicle according to an embodiment of the present invention. FIG. 4 to FIG. 6 are diagrams shown to explain the method for controlling purge of the vehicle according to an embodiment of the present invention. FIG. 7 is an diagram showing a setting map used in the method for controlling purge of the vehicle according to an embodiment of the present invention.

Referring to FIG. 3, the controller 250 may check or confirm the state information in order to control the purge of the vehicle in step S310. In embodiments, the state detector 220 may detect the state information including the duty of the purge valve 135, the flow amount of the purge valve 135, the number of rotation of the engine 110, and the engine roughness for each cylinder. The state detector may provide the detected state information to the controller 250. The controller 250 may receive the status information from the state detector and may check the state information.

The controller 250 may generate the amount of fuel using the amount of air of the cylinder, the compensation information, the lambda control value, and the amount of the purge gas in step S320.

The controller 250 may check the amount of air of the cylinder included in the engine 110.

The controller 250 may check the compensation information including at least one of a temperature compensation coefficient, an injector deviation coefficient, a lambda compensation coefficient, and a speed compensation coefficient. The temperature compensation coefficient may be a coefficient set in order to compensate for the amount of fuel based on temperature of the fuel at a start of the vehicle. The temperature compensation coefficient may be set differently depending on the temperature of the fuel, and may be set in advance.

The injector deviation coefficient may be a coefficient set by idle learning (e.g. idle learning of the engine) and may compensate for the amount of fuel based on a deviation for each injector 260. The injector deviation coefficient may be different depending on a type of the vehicle and may be set in advance.

The lambda compensation coefficient may be a coefficient for compensating for the amount of fuel based on the lambda control value and may be set in advance. The speed compensation coefficient may be a coefficient for compensating for the amount of fuel based on acceleration or deceleration of the vehicle, and the compensation coefficient based on acceleration or deceleration of the vehicle may be different.

The controller 250 may generate the amount of the purge gas using the flow amount of the purge valve 135 and a purge learning concentration value (e.g., a learning concentration value of the purge gas). In one implementation, the controller 250 may generate the amount of the purge gas using the flow amount of the purge valve 135 and the purge learning concentration value, as shown in a reference number 410 of FIG. 4.

As shown in FIG. 6, the purge learning concentration value may be generated by performing an integral control (I-control) using a lambda detection value, a ratio compensation coefficient, and a fuel compensation coefficient. The lambda detection value may represent detection information detected by the oxygen sensor 210. The ratio compensation coefficient may be a coefficient for compensating for the purge learning concentration value based on a ratio of the flow amount of the purge valve 135 to the amount of air. The fuel compensation coefficient may be a coefficient for compensating for the purge learning concentration value based on the amount of fuel of the injector 260. The ratio compensation coefficient and the fuel compensation coefficient may be set in advance.

As shown in a reference number 420 of FIG. 4, the controller 250 may generate the amount of fuel using the amount of air of the cylinder, the temperature compensation coefficient, the injector deviation coefficient, the lambda compensation coefficient, the lambda control value, the speed compensation coefficient, and the amount of the purge gas.

The controller 250 may determine whether the control entry condition is satisfied based on the state information in step S330.

In embodiments, as shown as FIG. 5, the controller 250 may determine that the control entry condition is satisfied when the duty of the purge valve 135 is greater than or equal to the first reference value, a ratio of the flow amount of the purge valve 135 to the amount of air is greater than or equal to a third reference value, the number of rotation of the engine is less than a fourth reference value, the lambda control value is less than the second reference value, and a roughness difference value maintained during a duration time is greater than or equal to a fifth reference value.

The roughness difference value may be generated by calculating a difference value between an average value of engine roughness of the fourth cylinder and an average value of engine roughness of one of the first to third cylinders. The third reference value to the fifth reference value may be set in advance as reference values to determine whether the control entry condition is satisfied.

The controller 250 may output an entry control value shown in FIG. 5 as 1 when the control entry condition is satisfied.

The controller 250 may check or confirm the purge distribution coefficient when the state information satisfies the control entry condition in step S340.

In embodiments, the controller 250 may check or confirm the setting map stored in advance when the state information satisfies the control entry condition. The setting map may be set by matching the cylinder information and the amount of the intake air with the purge distribution coefficient.

As shown in a reference number 430 of FIG. 4, the controller 250 may extract the purge distribution coefficient matched to the cylinder information and the amount of the intake air. For example, the controller 250 may set the setting map 700 as shown FIG. 7. When the cylinder information is 4 and the amount of the intake air is 5, the controller 250 may extract the purge distribution coefficient 0.7 matched to the cylinder information 4 and the amount of the intake air 5 from the setting map 700.

The controller 250 may generate the amount of redistribution of the purge gas using the amount of the purge gas and the purge distribution coefficient in step S350.

In embodiments, as shown in the reference number 430 of FIG. 4, the controller 250 may generate the amount of redistribution of the purge gas for each cylinder using a conversion coefficient, the purge distribution coefficient, and the amount of the purge gas. The conversion coefficient may be a coefficient for converting the amount of fuel to the injection time, and may be set in advance. Because the purge gas is redistributed to each cylinder, engine roughness generated by the intake manifold may be improved.

The controller 250 may generate the injection time for each cylinder using the amount of fuel, the conversion coefficient, and the amount of redistribution of the purge gas in step S360.

Specifically, as shown in the reference number 430 of FIG. 4, the controller 250 may generate a first injection time for a first injector of the two injectors 260 and a second injection time for a second injector of the two injectors using the amount of fuel, the conversion coefficient, and the amount of redistribution of the purge gas when the entry control value is 1 so that a first switch 433 is closed. The first switch 433 may be closed only when 1 is input and may be open when another value other than 1 is input.

When the state information does not satisfy the control entry condition, the controller 250 may output a value other than 1 as the entry control value. As shown in the reference number 430 of FIG. 4, the controller 250 may generate the first injection time and the second injection time using the amount of fuel and the conversion coefficient when the entry control value is not 1 so that the first switch 433 is open.

The controller 250 may supply fuel to the engine 110 by controlling the first injector based on the first injection time, and may supply fuel to the engine by controlling the second injector based on the second injection time.

When the purge learning concentration value is not learned, the controller 250 may solve imbalance of the air/fuel ratio using the purge learning concentration value and the lambda control value.

The controller 250 may generates the first injection time and the second injection time using a lambda distribution coefficient.

In embodiments, the controller 250 may generate a learning determination value as 1 when the controller determines that the purge learning concentration value has not been learned before. For example, the controller 250 may determine that the purge learning concentration value has not been learned before when a predetermined time interval after start of the purge control does not pass or a difference value between a lambda target value and the lambda detection value is greater than or equal to a predetermined value.

As shown in a reference number 440 of FIG. 4, the controller 250 may generate the lambda distribution coefficient using the lambda control value and the purge distribution coefficient.

In one embodiment, the controller 250 may generate the lambda distribution coefficient using Equation 1 below.

$$LD = \frac{1 - ((1 - LK) * PD)}{LK} \qquad \text{[Equation 1]}$$

Here, the LD may represent the lambda distribution coefficient, the LK may represent the lambda control value, and the PD may represent the purge distribution coefficient.

As shown in the reference number 430 of FIG. 4, the controller 250 may generate the first injection time and the second injection time using the amount of fuel, the conversion coefficient, the lambda distribution coefficient, and the amount of redistribution of the purge gas when the learning determination value is 1 so that a second switch 435 is closed. The second switch 435 may be closed only when 1 is input and may be open when another value other than 1 is input.

The controller 250 may quickly learn the purge learning concentration value using a proportional integral control.

In embodiments, as shown as FIG. 6, the controller 250 may generate the purge learning concentration value by performing the integral control using an integral speed compensation coefficient when the learning determination value is 1 so that a third switch 633 is closed. The integral speed compensation coefficient may be a coefficient set to improve speed of integral and may be set in advance. The third switch 633 may be closed only when 1 is input and may be open when another value other than 1 is input.

In addition, as shown as FIG. 6, the controller 250 may generate the purge learning concentration value by performing the proportional integral control using the lambda detection value, the ratio compensation coefficient, and the fuel compensation coefficient when the learning determination value is 1 so that a fourth switch 635 is closed. The fourth switch 635 may be closed only when 1 is input and may be open when another value other than 1 is input.

Accordingly, the embodiment of the present invention may solve the imbalance of the air/fuel ratio by learning the purge concentration value through the proportional integral control when the purge concentration value is not learned to redistribute the lambda control value.

Figure 8A:
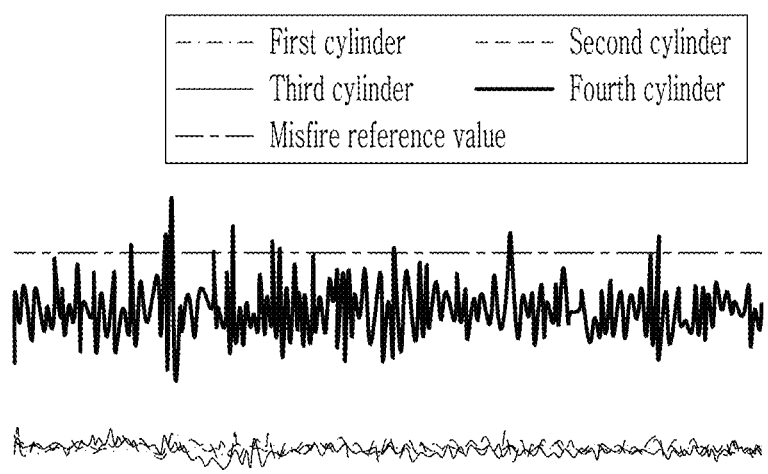
FIGS. 8A and 8B are graphs explaining an effect of the method for controlling purge of the vehicle according to an embodiment of the present invention.
Figure 8B:
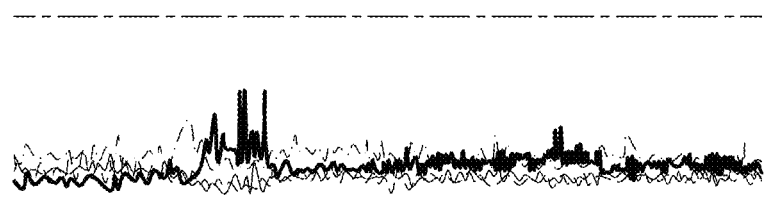

FIG. 8A and FIG. 8B are graphs explaining an effect of the method for controlling purge of the vehicle according to an embodiment of the present invention.

In a comparative implementation, as shown in FIG. 8A, engine roughness of a fourth cylinder of an engine may be increased due to poor shape of an intake manifold of the engine so that a misfire of the engine occurs. Thus, output and performance of the engine 110 may be deteriorated.

The embodiment of the present invention may redistribute the amount of the purge gas using the purge distribution coefficient for each cylinder to inject a different amount of fuel in each cylinder through the injector 260. Thus, engine roughness of the fourth cylinder may be maintained similar to that of the other cylinders as shown in FIG. 8B so that the embodiment of the present invention generates a uniform air/fuel ratio.

While embodiments of this invention have been described, it is to be understood that the invention is not limited to the disclosed embodiments, but, on the contrary, is intended to cover various modifications and equivalent arrangements included within the spirit and scope of the appended claims.

DESCRIPTION OF SYMBOLS

110: engine
115: intake manifold
120: canister
135: purge valve
150: fuel tank
210: oxygen sensor
220: state detector
233: duty detector
235: flow amount detector
237: number-of-rotation detector
239: roughness detector
250: controller
260: injector

What is claimed is:

1. A device for controlling purge of an evaporation gas of a fuel tank collected in a canister of a vehicle, the device comprising:
a state detector configured to acquire state information to control purge of an engine of the vehicle;
a controller configured to:
generate an amount of fuel supplied to each of a plurality of cylinders of the engine using an amount of air from each of the plurality of cylinders, compensation information a lambda control value, and an amount of a purge gas of the engine,
check a purge distribution coefficient based on an amount of an intake air for each of the plurality of cylinders and cylinder information that is a number indicating an order of each of the plurality of cylinders when the state information satisfies a control entry condition,
generate an amount of redistribution of the purge gas using the amount of the purge gas and the purge distribution coefficient, and
generate an injection time for each of the plurality of cylinders using the amount of fuel, a conversion coefficient for converting the amount of fuel to the injection time, and the amount of redistribution of the purge gas; and
an injector configured to inject fuel in each of the plurality of cylinders during the injection time based on control of the controller,
wherein the compensation information includes a temperature compensation coefficient, an injector deviation coefficient, a lambda compensation coefficient, or a speed compensation coefficient,
wherein the state information comprises a duty cycle of a purge valve transferring the purge gas and further includes the lambda control value,
wherein the controller is configured to determine that the state information satisfies the control entry condition when the duty cycle of the purge valve is greater than or equal to a first reference value and the lambda control value is less than a second reference value,
wherein the state information further comprises a ratio of a flow amount of the purge gas transferring the purge valve to the amount of air, a number of rotation of the engine, and an engine roughness difference value between the cylinders, and
wherein the controller is configured to determine that the state information satisfies the control entry condition when the ratio of the flow amount of the purge gas to the amount of air is greater than or equal to a third reference value, the number of rotation of the engine is less than a fourth reference value, and the engine roughness difference value between the cylinders is greater than or equal to a fifth reference value.

2. The device of claim 1, wherein the controller is configured to generate the amount of the purge gas using a flow amount of the purge valve transferring the purge gas and a purge learning concentration value.

3. The device of claim 2, wherein the controller is configured to generate the purge learning concentration value by performing an integral control using a lambda detection value, a compensation coefficient based on a ratio of the flow amount of the purge valve to the amount of air, and a compensation coefficient based on an amount of fuel of the injector.

4. The device of claim 1, wherein the engine includes a first cylinder, a second cylinder, a third cylinder, and a fourth cylinder, and
wherein the controller is configured to generate the engine roughness difference value by calculating a difference value between an average value of engine roughness of the fourth cylinder and an average value of engine roughness of one of the first cylinder, the second cylinder, and the third cylinder.

5. The device of claim 1, wherein the controller is configured to check a setting map matching information of each of the plurality of cylinders and the amount of the intake air with the purge distribution coefficient and to extract the purge distribution coefficient matched to the cylinder information and the amount of the intake air.

6. The device of claim 1, wherein the controller is configured to generate a lambda distribution coefficient using the lambda control value and the purge distribution coefficient and to generate the injection time using the amount of fuel, the conversion coefficient, the amount of redistribution of the purge gas, and the lambda distribution coefficient.

7. A method for controlling purge of an evaporation gas of a fuel tank collected in a canister of a vehicle, the method comprising:
checking, by a controller, state information;
generating, by the controller, an amount of fuel supplied to each of a plurality of cylinders of the engine using an amount of air from each of the plurality of cylinders, compensation information a lambda control value, and an amount of a purge gas of the engine;
determining, by the controller, whether the state information satisfies a control entry condition;
checking, by the controller, a purge distribution coefficient based on an amount of an intake air for each of the plurality of cylinders and information that is a number indicating an order of each of the plurality of cylinders when the state information satisfies the control entry condition;

generating, by the controller, an amount of redistribution of the purge gas using the amount of the purge gas and the purge distribution coefficient; and generating, by the controller, an injection time for each of the plurality of cylinders using the amount of fuel, a conversion coefficient for converting the amount of fuel to the injection time, and the amount of redistribution of the purge gas, wherein the compensation information includes a temperature compensation coefficient, an injector deviation coefficient, a lambda compensation coefficient, or a speed compensation coefficient, wherein the state information comprises a duty cycle of a purge valve transferring the purge gas and further includes the lambda control value, wherein the determining whether the state information satisfies the control entry condition comprises:

determining, by the controller, that the state information satisfies the control entry condition when the duty cycle of the purge valve is greater than or equal to a first reference value, and the lambda control value is less than a second reference value, and wherein the state information further comprises a ratio of a flow amount of the purge gas transferring a purge valve to the amount of air, a number of rotation of the engine, and an engine roughness difference value between the cylinders, wherein the determining whether the state information satisfies the control entry condition comprises:

determining, by the controller, that the state information satisfies the control entry condition when the ratio of the flow amount of the purge gas to the amount of air is greater than or equal to a third reference value, the number of rotation of the engine is less than a fourth reference value, and the engine roughness difference value between the cylinders is greater than or equal to a fifth reference value.

8. The method of claim 7, wherein the generating the amount of fuel comprises:

generating, by the controller, the amount of the purge gas using a flow amount of the purge valve transferring the purge gas and a purge learning concentration value; and generating, by the controller, the amount of fuel using the amount of air of each of the plurality of cylinders, the temperature compensation coefficient, the injector deviation coefficient, the lambda compensation coefficient, or the speed compensation coefficient included in the compensation information, the lambda control value, and the amount of the purge gas.

9. The method of claim 8, wherein the generating the amount of the purge gas comprises generating, by the controller, the purge learning concentration value by performing an integral control using a lambda detection value, a compensation coefficient based on a ratio of the flow amount of the purge valve to the amount of air, and a compensation coefficient based on an amount of fuel of the injector.

10. The method of claim 7, wherein the checking the purge distribution coefficient comprises extracting, by the controller, the purge distribution coefficient matched to the information of each of the plurality of cylinders and the amount of the intake air to check the purge distribution coefficient.

11. The method of claim 7, wherein the generating the injection time comprises:

generating, by the controller, a lambda distribution coefficient using the lambda control value and the purge distribution coefficient; and generating, by the controller, the injection time using the amount of fuel, the conversion coefficient, the amount of redistribution of the purge gas, and the lambda distribution coefficient.

* * * * *